United States Patent
Gauthier et al.

(10) Patent No.: US 7,062,662 B2
(45) Date of Patent: Jun. 13, 2006

(54) I/O RESONANCE CANCELLATION CIRCUIT BASED ON CHARGE-PUMPED CAPACITORS

(75) Inventors: Claude R. Gauthier, Cupertino, CA (US); Aninda K. Roy, San Jose, CA (US); Brian W. Amick, Austin, TX (US)

(73) Assignee: Sun Microsystems, Inc., Santa Clara, CA (US)

( * ) Notice: Subject to any disclaimer, the term of this patent is extended or adjusted under 35 U.S.C. 154(b) by 547 days.

(21) Appl. No.: 10/328,069

(22) Filed: Dec. 23, 2002

(65) Prior Publication Data

US 2004/0123166 A1 Jun. 24, 2004

(51) Int. Cl.
*G06F 1/26* (2006.01)
*H02J 1/02* (2006.01)
*G05F 3/02* (2006.01)

(52) U.S. Cl. .................. 713/300; 363/39; 327/538
(58) Field of Classification Search ............... 713/300; 326/73; 324/158.1; 323/282; 341/172; 363/39; 327/538

See application file for complete search history.

(56) References Cited

U.S. PATENT DOCUMENTS

| | | | | |
|---|---|---|---|---|
| 3,585,493 A | * | 6/1971 | Moerlein | 323/248 |
| 5,105,102 A | * | 4/1992 | Shioda | 326/73 |
| 5,371,457 A | * | 12/1994 | Lipp | 324/158.1 |
| 5,646,622 A | * | 7/1997 | Kuttner | 341/172 |
| 6,566,847 B1 | * | 5/2003 | Chou et al. | 323/282 |
| 6,791,390 B1 | * | 9/2004 | Gay | 327/332 |

* cited by examiner

*Primary Examiner*—Thomas Lee
*Assistant Examiner*—Suresh K Suryawanshi
(74) *Attorney, Agent, or Firm*—Osha Liang LLP (57) ABSTRACT

An apparatus for canceling an effect of power supply resonance is provided. The effect of power supply resonance is a variation in power supply voltage potential. This variation may substantially affect an output buffer by causing the output buffer's output to sag below desired values. A voltage regulating circuit is coupled to power supply lines local to the output buffer where the voltage regulating circuit is most effective in reducing voltage potential variation. An exemplary voltage regulating circuit is provided that uses charge-pumped capacitors to raise the power supply voltage potential when it falls below a desired value. A second example of a voltage regulating circuit uses charge-pumped capacitors to lower the power supply voltage potential when it rises above a desired value.

20 Claims, 7 Drawing Sheets

I/O RESONANCE CANCELLATION CIRCUIT BASED ON CHARGE-PUMPED CAPACITORS

BACKGROUND OF INVENTION

Figure 1:
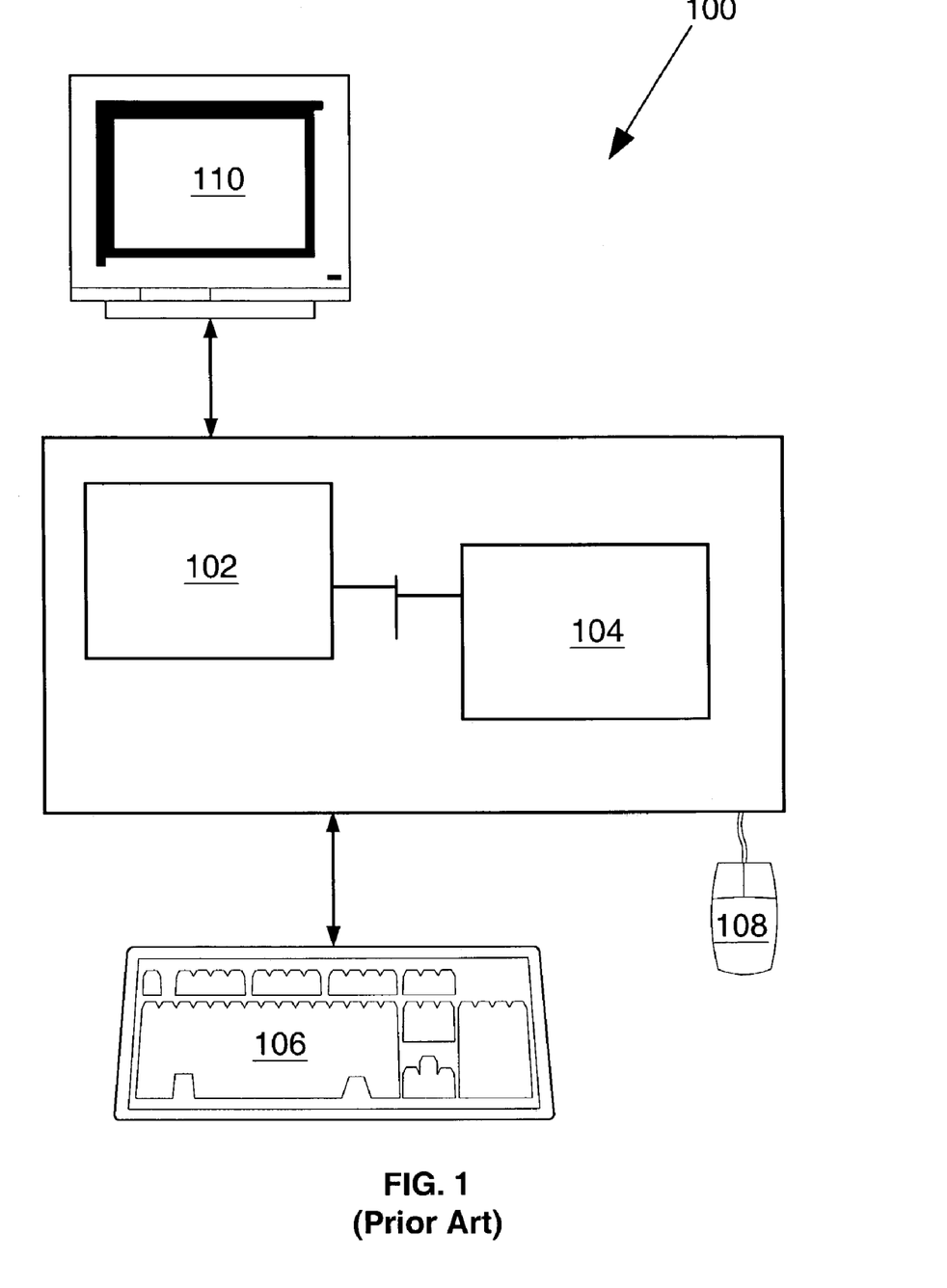
FIG. 1 shows a computer system.

As shown in FIG. 1, a common computer system (100) includes a central processing unit (CPU) (102), memory (104), and numerous other elements and functionalities typical of today's computers (not shown). The computer (100) may also include input means, such as a keyboard (106) and a mouse (108), and output devices, such as a monitor (110). Those skilled in the art will understand that these input and output means may take other forms in an accessible environment. In one or more embodiments of the invention, the computer system may have multiple processors and may be configured to handle multiple tasks.

The CPU (102) is an integrated circuit (IC) and is typically one of many integrated circuits included in the computer (100). Integrated circuits may perform operations on data and transmit resulting data to other integrated circuits. The correct operation of the computer relies on accurate transmission of data between integrated circuits.

An IC operates between two power supply lines, one at a higher voltage potential and one at a lower voltage potential. In the present invention, the higher voltage potential power supply line is designated $V_{DD}$. The lower voltage potential power supply line may supply any voltage potential lower than the higher voltage potential power supply line, but typically it will supply a zero voltage potential also referred to as ground. In the present invention, the lower voltage potential power supply line is designated $V_{SS}$. The difference between $V_{DD}$ and $V_{SS}$ is a power supply voltage potential. The power supply maintains the power supply voltage potential.

Figure 2:
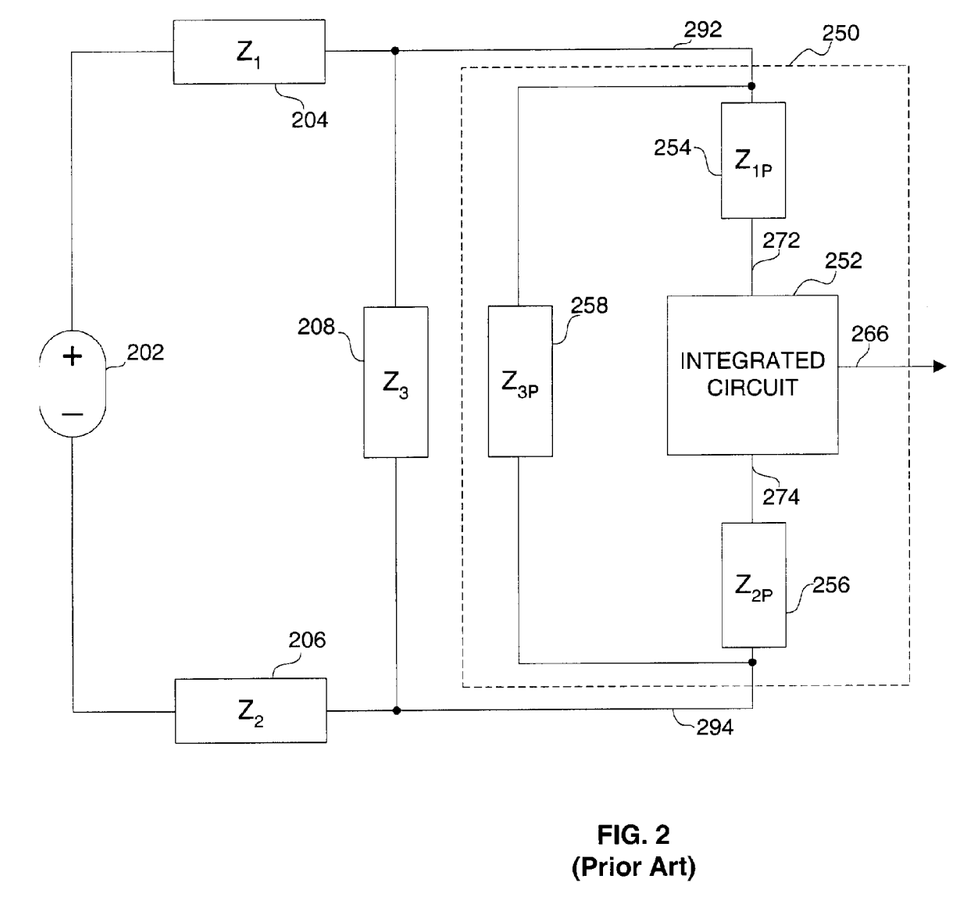
FIG. 2 shows a diagram of a power distribution network for an integrated circuit.

FIG. 2 shows a diagram of an IC (252), a chip package (250), and a power distribution network for the IC (252). The power distribution network includes impedances $Z_1$ (204), $Z_2$ (206), and $Z_3$ (208). Impedances (204, 206, 208) may include resistive, capacitive, and inductive elements and model both the inherent parasitics of the power distribution network and added components that may affect the voltage potentials supplied to the IC (252). The power propagated to the IC (252) must traverse from a power supply (202) across the power distribution network to the chip package (250).

Two power supply lines (292, 294) propagate power from the power distribution network to the chip package (250) on which the IC (252) is mounted. On the chip package (250), other components and parasitics, represented by impedances $Z_{1P}$ (254), $Z_{2P}$ (256), and $Z_{3P}$ (258), affect the voltage potentials propagated to the IC (252) and may contain resistive, capacitive, and inductive elements. The voltage potentials supplied to the IC (252) on lines (272) and (274) may vary from the voltage potentials produced by the power supply (202) due to effects of the impedances (204, 206, 208) in the power distribution network and the impedances (254, 256, 258) in the chip package (250).

The impedances (204, 206, 208) in the power distribution network and the impedances (254, 256, 258) in the chip package form a "parasitic tank circuit" that may resonate if a frequency of switching of elements within the IC (252) closely matches a resonant frequency of the parasitic tank circuit. A power supply resonance is manifested as an oscillation or "ringing" of the power supply voltage potential at the resonant frequency. Ringing of the power supply voltage potential may affect the IC (252) by limiting the power of transmitted signals. In order to avoid ringing and its undesirable effects on IC operation, the power supply resonance must be suitably controlled.

Conventional methods of controlling resonance include connecting an external capacitor between the power supply lines (292) and (294). This connection creates a local power supply that may supply power to the IC (252) as needed. However, this method does not significantly reduce the ringing caused by impedances (254, 256, 258) in the chip package (250).

Figure 3:
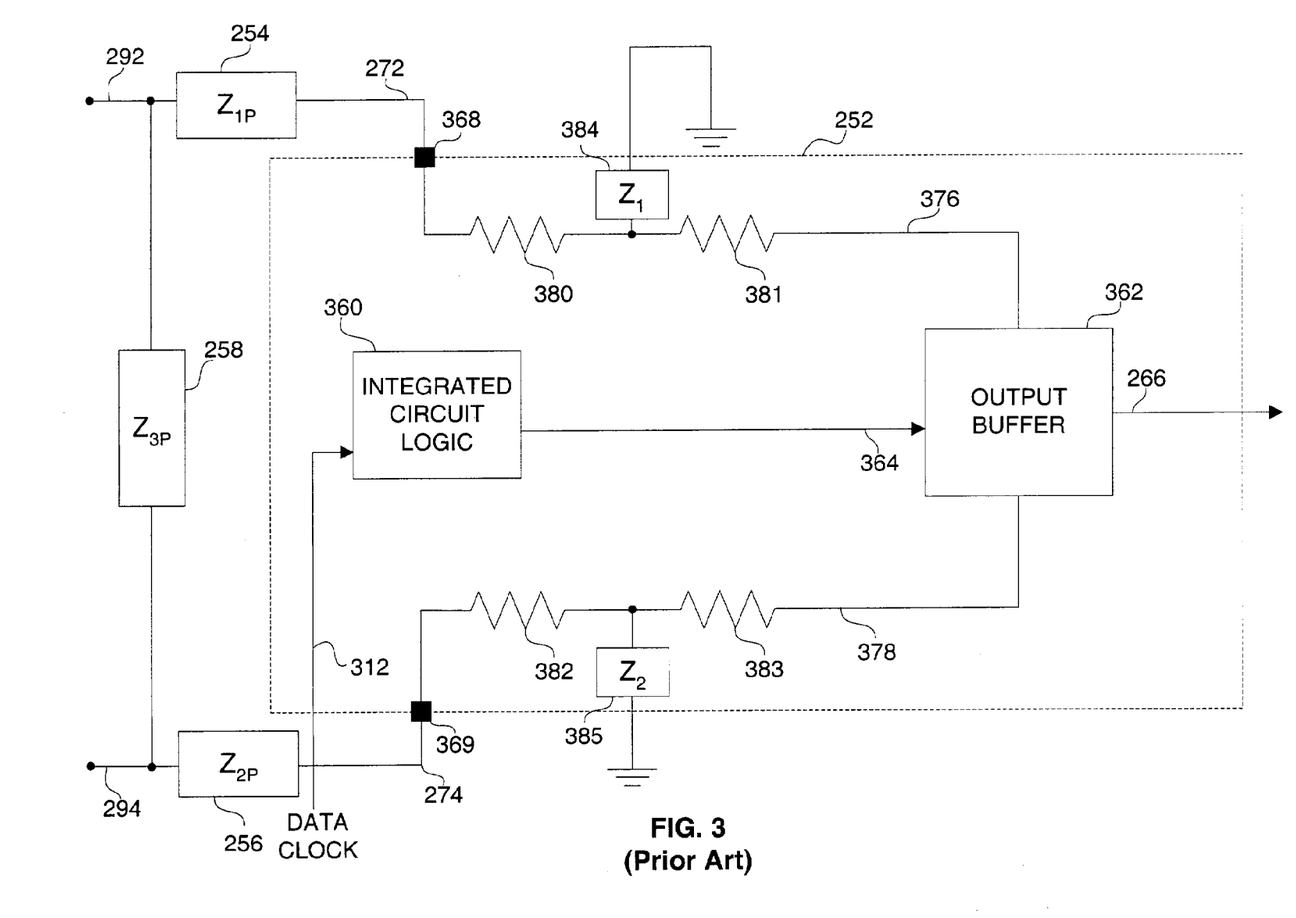
FIG. 3 shows a diagram of an integrated circuit and its power distribution network.

FIG. 3 shows a detailed view of the IC (252) shown in FIG. 2. Like items in FIG. 2 and FIG. 3 are shown with like reference numbers. In FIG. 3, the IC (252) includes IC logic (360) and an output buffer (362). The IC (252) may operate with a data clock signal supplied on line (312). The data clock signal is used to synchronize data input to and output from the IC (252). Data output by the IC logic (360) is sent on line (364) to the output buffer (362) for transmission on line (266) to a receiver (not shown). In one or more embodiments, the IC logic (360) and the output buffer (362) may use separate power supply lines.

Inside the IC (252), the power supply voltage potential is affected further by resistive and capacitive elements on the IC (252). Power pads (368, 369) mark the interface between the IC (252) and the chip package (250 shown in FIG. 2). $V_{DD}$ is supplied to the power pad (368) and propagated to the output buffer (362) on line (376). $V_{SS}$ is supplied to the power pad (369) and propagated to the output buffer (362) on line (378). The power supply lines (376) and (378) are wires on the IC (252) and present some resistance to current flow. In FIG. 3, the resistance of line (376) is represented by resistors (380, 381). The resistance of line (378) is represented by resistors (382, 383). There is also some parasitic capacitance between the power supply lines (376, 378) and other lines (not shown) in the IC (252). In FIG. 3, capacitances between the power supply lines (376, 378) and other lines (not shown) are represented by impedances $Z_1$ (384) and $Z_2$ (385), respectively.

SUMMARY OF INVENTION

According to one embodiment of the present invention, an apparatus for compensating for power supply resonance in an integrated circuit comprises a first power supply line arranged to propagate a first voltage potential; a second power supply line arranged to propagate a second voltage potential, where a power supply voltage potential is a difference between the first voltage potential and the second voltage potential; an output buffer operatively coupled to the first power supply line and the second power supply line; and a voltage regulating circuit operatively coupled to the first power supply line and the second power supply line, where the voltage regulating circuit is local to the output buffer, and where the voltage regulating circuit is arranged to reduce a change in the power supply voltage potential.

According to one embodiment of the present invention, a method for compensating for a power supply resonance in an integrated circuit comprises propagating a first voltage potential on a first power supply line to the integrated circuit; propagating a second voltage potential on a second power supply line to the integrated circuit, where a power supply voltage potential is a difference between the first voltage potential and the second voltage potential; detecting a change in the power supply voltage potential local to an output buffer; and selectively reducing the change in the power supply voltage potential local to the output buffer dependent on the detecting.

According to one embodiment of the present invention, an apparatus for compensating for power supply resonance in an integrated circuit comprises means for propagating a first voltage potential to the integrated circuit; means for propagating a second voltage potential to the integrated circuit, where a power supply voltage potential is a difference between the first voltage potential and the second voltage potential; output means for outputting a data signal; means for detecting a change in the power supply voltage potential local to the output means; and means for selectively reducing the change in the power supply voltage potential local to the output buffer dependent on the means for detecting.

DETAILED DESCRIPTION

Figure 4:
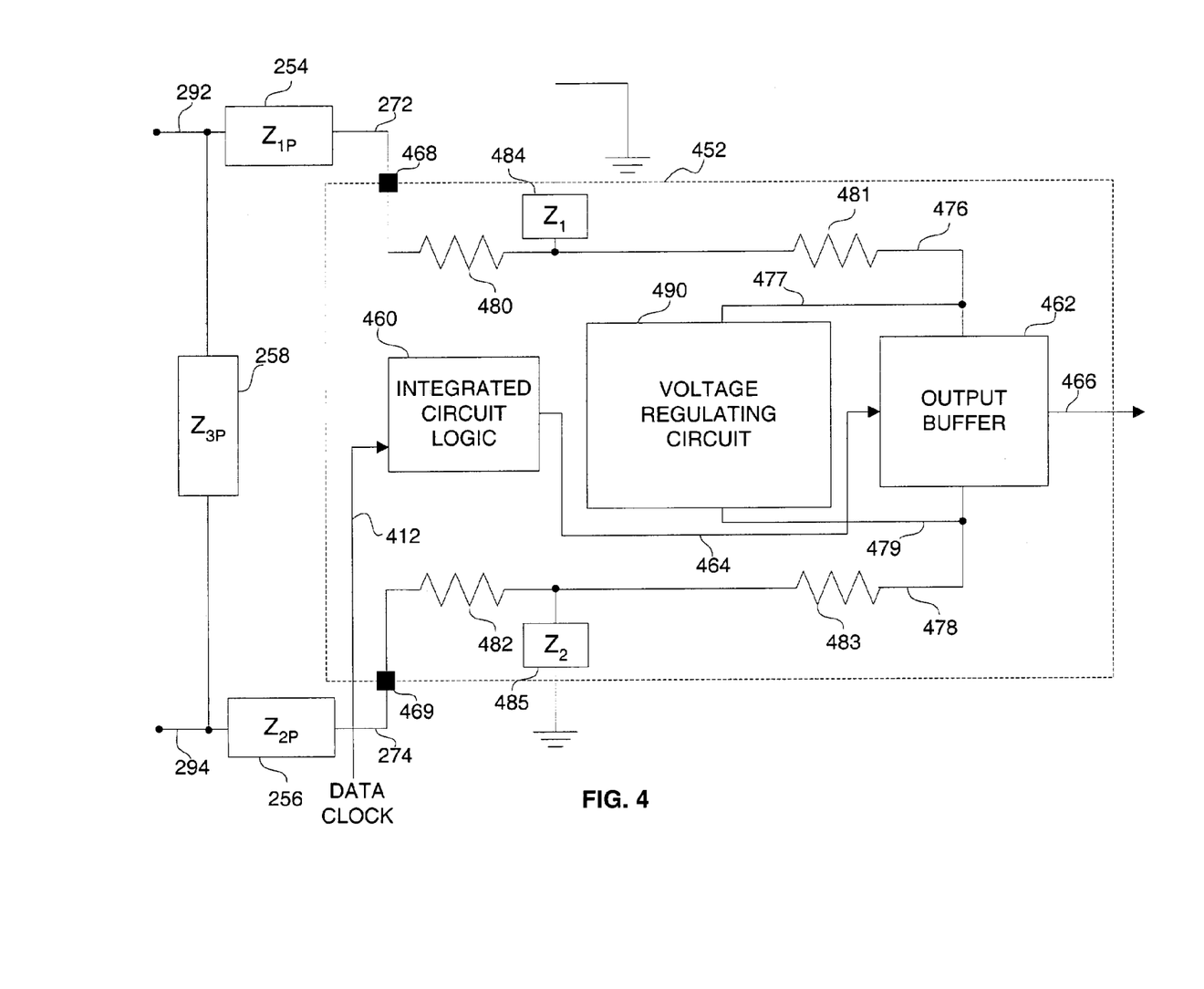
FIG. 4 shows a block diagram of an integrated circuit in accordance with an embodiment of the present invention.

Embodiments of the present invention relate to circuitry for regulating a voltage potential on a power supply line for an IC output buffer, where the voltage potential is affected by power supply resonance. FIG. 4 shows an exemplary voltage regulation system in accordance with an embodiment of the present invention. Like items from FIGS. 2 and 4 are shown with like reference numbers.

In FIG. 4, the IC (452) includes IC logic (460) and an output buffer (462). The IC (452) may operate with a data clock signal supplied on line (412). The data clock signal is used to synchronize data input to and output from the IC (452). Data output by the IC logic (460) is sent on line (464) to the output buffer (462) for transmission on line (466) to a receiver (not shown). In one or more embodiments, the IC logic (460) and the output buffer (462) may use separate power supply lines. Power pads (468, 469) mark the interface between the IC (452) and the chip package (250 shown in FIG. 2).

A voltage regulating circuit (490) is operatively connected to two power supply lines (476, 478) local to the output buffer by lines (477, 479). Resistors (480, 481, 482, 483) and impedances (484, 485) represent the parasitics of the power supply lines (476, 478).

For the purposes of this disclosure, "local to" is an electrical relationship. The value of any resistance, inductance, and capacitance of lines (477, 479) that connect the voltage regulating circuit (490) to the output buffer (462) is considered to be low-impedance. One of ordinary skill in the art will understand what a low-impedance connection is in the context of current technology. The actual values of resistance, inductance, and capacitance that connect the voltage regulating circuit (490) to the output buffer (462) may change as IC technologies change.

The voltage regulating circuit (490) is electrically close enough to the output buffer (462) such that the voltage regulating circuit (490) can successfully detect and counteract disturbances at a resonant frequency of a parasitic tank circuit. To detect and counteract disturbances at the resonant frequency, the voltage regulating circuit (490) must be able to respond to a disturbance in less time than one half-cycle at the resonant frequency. The time duration of one half-cycle at the resonant frequency is equal to the inverse of $2*f_{RES}$, where $f_{RES}$ is the resonant frequency. The time it takes for a disturbance to be corrected is a system response time. The system response time is a sum of the time required for the disturbance to propagate to the voltage regulating circuit (490), an inherent response time of the voltage regulating circuit (490), and the time required for the corrective response of the voltage regulating circuit (490) to propagate to the output buffer (462).

The inherent response time of the voltage regulating circuit (490) is the time required for the voltage regulating circuit (490) to respond to a disturbance. The inherent response time may be on the order of several hundred picoseconds. The time for the disturbance to propagate on a line is at least a time constant of the line. The time constant of the line is equal to the line's resistance times the line's capacitance. For effective correction, a disturbance must propagate to the voltage regulating circuit (490), the voltage regulating circuit (490) must respond and the corrective response must propagate to the output buffer (462) in less time than one half-cycle of the resonance frequency. That is, $$\frac{1}{2f_{RES}} \geq t_R + 2RC, \quad (1)$$

where $f_{RES}$ is the resonant frequency, $t_R$ is the inherent response time of the voltage regulating circuit (490), R is the resistance of a line (e.g., 477, 479), and C is a capacitance of the line (e.g., 477, 479).

The resistance and capacitance of lines (477, 479) are proportional to the length of the lines (477, 479). As the length of the lines (477, 479) increase, so do the resistance and capacitance of the lines (477, 479). As R and C increase, the maximum value of $f_{RES}$ that satisfies Equation 1 decreases. While properties of the voltage regulating circuit (490) and the lines (477, 479) satisfy equation 1, the voltage regulating circuit (490) will effectively correct resonant frequency disturbances in a power supply voltage potential of the output buffer (462). Along with a equations to describe the relationships between resistance and length and capacitance and length, equation 1 may be used to define an effective radius such that any voltage regulating circuit (490) within the effective radius of the output buffer (462) will effectively correct resonant frequency disturbances in the power supply voltage potential of the output buffer (462).

For the purposes of this disclosure, a "local to" may further define a low-impedance connection between the voltage regulating circuit (490) and the output buffer (462) such that the voltage regulating circuit (490) effectively regulates a voltage of the output buffer (462). A voltage regulating circuit (490) is not local to the output buffer (462) if reducing a length of the connection between the voltage regulating circuit (490) and the output buffer (462) substantially improves the effectiveness of the voltage regulating circuit (490) to regulate a voltage of the output buffer (462).

In one or more embodiments, the voltage regulating circuit (490) may include a charge pump. A charge pump may be used to raise a voltage potential that is lower than desired, or it may be used to lower a voltage potential that is higher than desired. To form a voltage regulating circuit capable of regulating voltage potentials that may be higher or lower than desired, two oppositely configured charge pumps may be employed.

Figure 5:
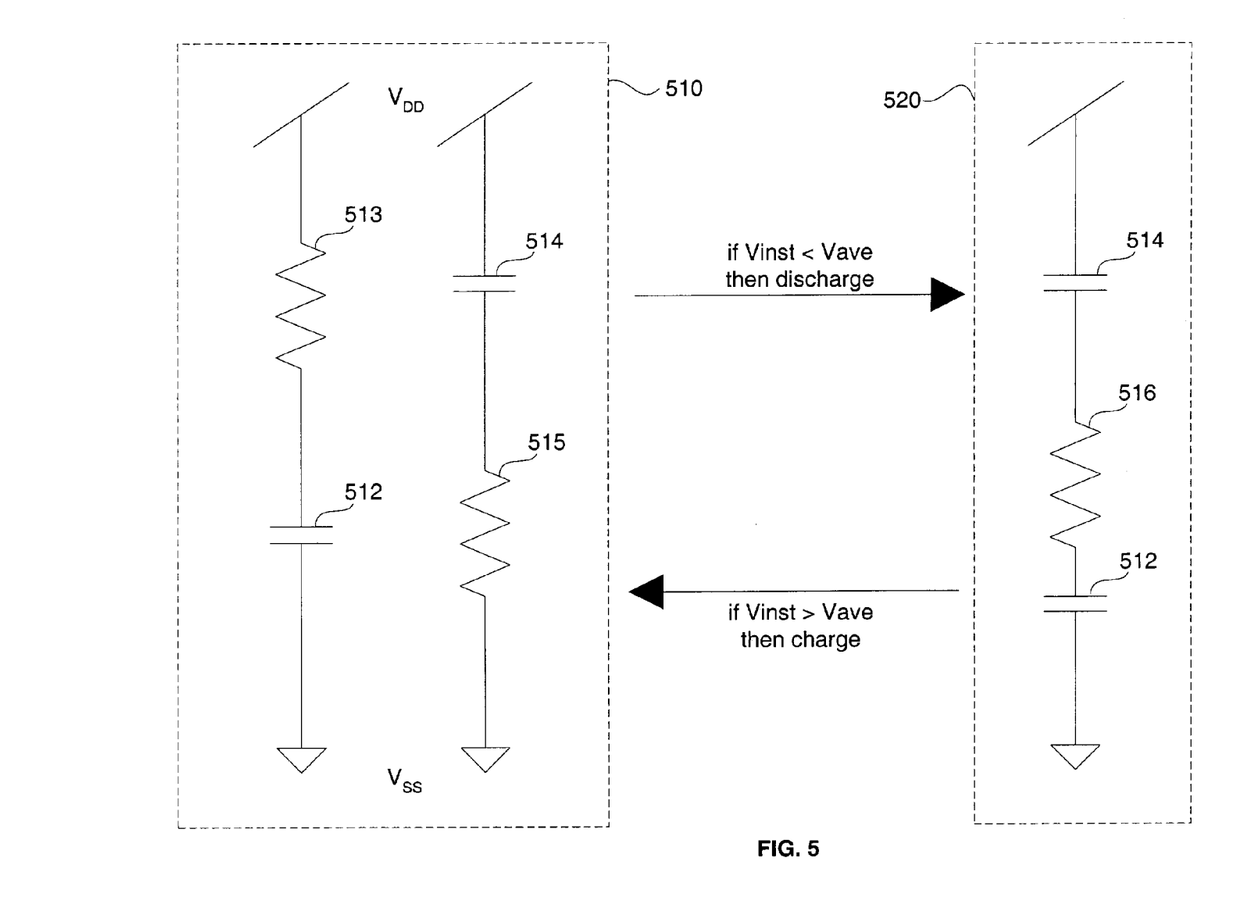
FIG. 5 shows a charge pump cycle in accordance with an embodiment of the present invention.

The operating cycle for a charge pump to raise a voltage potential that is lower than desired is illustrated in FIG. 5. Resistors (513, 515, 516) represent line resistance and resistance of the capacitors (512, 514). While a power supply voltage potential is at or above a desired value, the charge pump operates in a parallel configuration (510), with n capacitors (512, 514) each with capacitance C connected in parallel between $V_{DD}$ and $V_{SS}$, where n is at least two. Each capacitor (512, 514) will charge to the power supply voltage potential. Total capacitance in the parallel configuration (510) is C*n. When the power supply voltage potential falls below the desired value, the capacitors (512, 514) are reconfigured to a series configuration (520). In the series configuration (520), the total capacitance is C/n.

Total charge stored by a capacitor (512, 514) is equal to the capacitance times the voltage potential across the capacitor. Because total charge stored by the capacitors (512, 514) cannot change instantaneously, as total capacitance falls to C/n, the total voltage potential across the capacitors in the series configuration (520) rises to $n*(V_{DD}-V_{SS})$. Following the switch to the series configuration (520), charge will leave the capacitors (512, 514) through the power supply lines, raising the power supply voltage potential as it does so. When the power supply voltage potential has risen back to the desired value, the capacitors (512, 514) are switched back to the parallel configuration (510) and recharged.

Accordingly, a switch between the parallel configuration (510) and the series configuration (520), and vice versa, may be determined from a measurement of an instantaneous power supply voltage potential versus an average power supply voltage potential. For example, the series configuration (510) may switch to the parallel configuration (520) when the instantaneous power supply voltage potential is less than the average power supply voltage potential. Also, the parallel configuration (520) may switch to the series configuration when the instantaneous power supply voltage potential is greater than the average power supply voltage potential.

Figure 6:
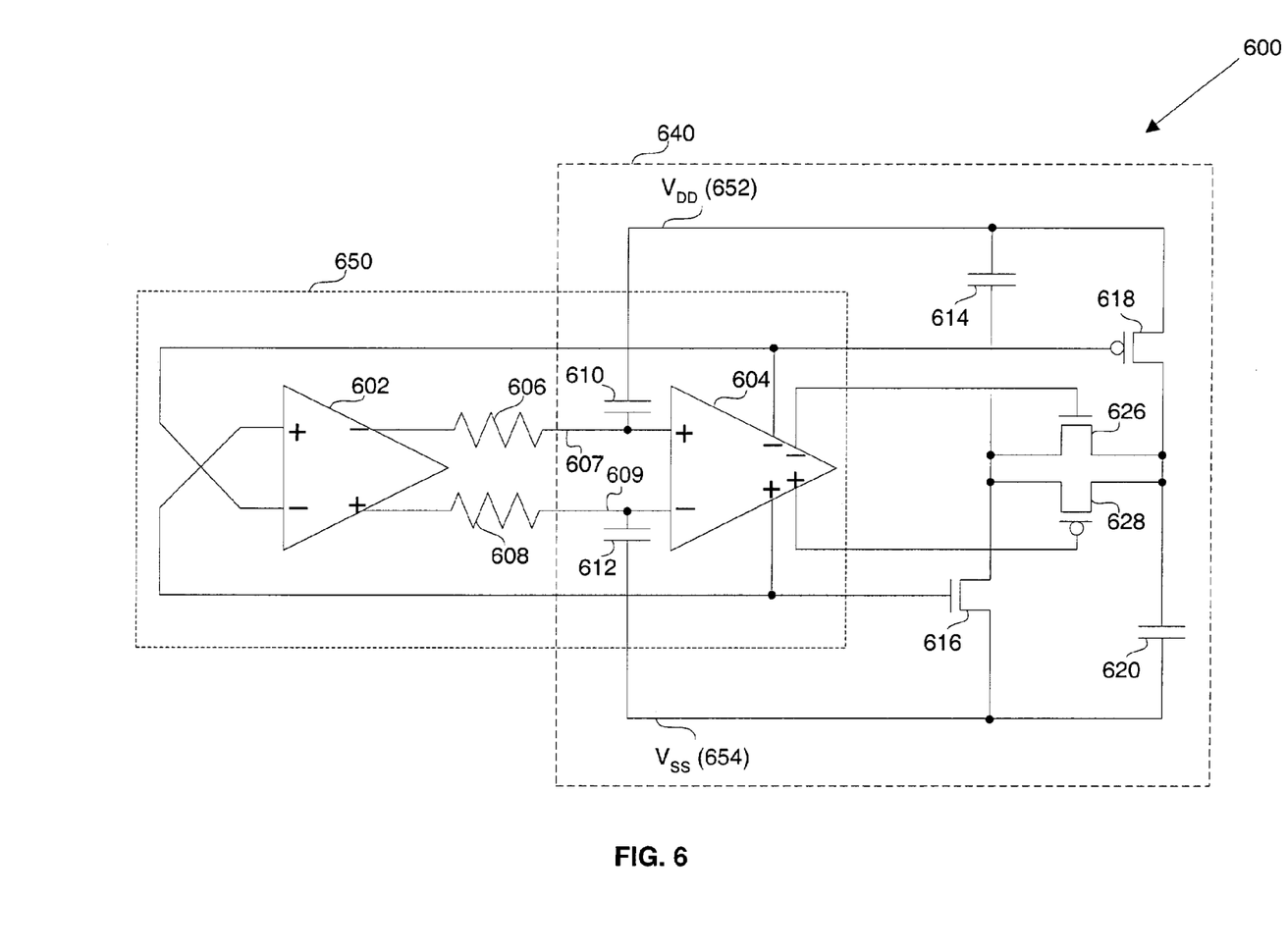
FIG. 6 shows a schematic of a voltage regulating circuit in accordance with an embodiment of the present invention.

FIG. 6 shows a schematic of an exemplary voltage regulation circuit (600) in accordance with an embodiment of the present invention. The circuit shows mutually exclusive CMOS switches (616, 626) and mutually exclusive CMOS switches (618, 628) to configure the capacitors (614, 620) to either be in a parallel configuration or in a series configuration. The circuit has two sections: a $V_{avg}$ (average voltage potential) tracking loop (650) and a $V_{inst}$ (instantaneous voltage potential) monitor and charge pump loop (640). The switches (616, 618, 626, 628) are driven by a comparator (604). The comparator (604) provides two sets of complementary outputs with a voltage offset to ensure minimal leakage through both charge and discharge switches during switching activity.

When the instantaneous voltage potential is at or above the average voltage potential, the integrated circuit is operating properly, and no response from the voltage regulating circuit (600) is necessary. In this case, the voltage regulating circuit's (600) capacitors (626, 636) are in the parallel configuration (510 shown in FIG. 5). When the instantaneous voltage falls below the average voltage, as determined by the comparator (604), the capacitors (626, 636) are switched to the series configuration (520 shown in FIG. 5). This creates a voltage spike on the power supply lines (652, 654), and boosts the instantaneous voltage potential. If the instantaneous voltage potential rises above the average voltage potential, the capacitors (626, 636) are switched back into the parallel configuration (510 shown in FIG. 5) for recharging.

Instantaneous voltage potential ($V_{ins}$) variation is monitored by coupling $V_{DD}$ (652) and $V_{SS}$ (654) onto inputs to the comparator (604) that is dynamically biased by an amplifier configured as a bias generator (602) about an average voltage potential ($V_{avg}$). $V_{avg}$ is a difference between the voltage potential carried on line (607) and the voltage potential carried on line (609) and is a high-pass filtered version of the local $(V_{DD}-V_{SS})/2$ delivered through high-pass filters formed by resistor (606) and capacitor (610), and resistor (608) and capacitor (612). The low frequency cutoff of the high-pass filter is below the resonant frequency of the parasitic tank circuit, but it also rejects the tracking of low-frequency disturbances that are not caused by resonance. $V_{inst}$ feeds the main negative feedback loop as charge is pumped into and out of the switched capacitors (614) and (620) coupled to the power supply lines in an attempt to defeat voltage variations. The compensated high frequency cutoff ensures stable loop response while also clearing the high end of the resonance range.

Figure 7:
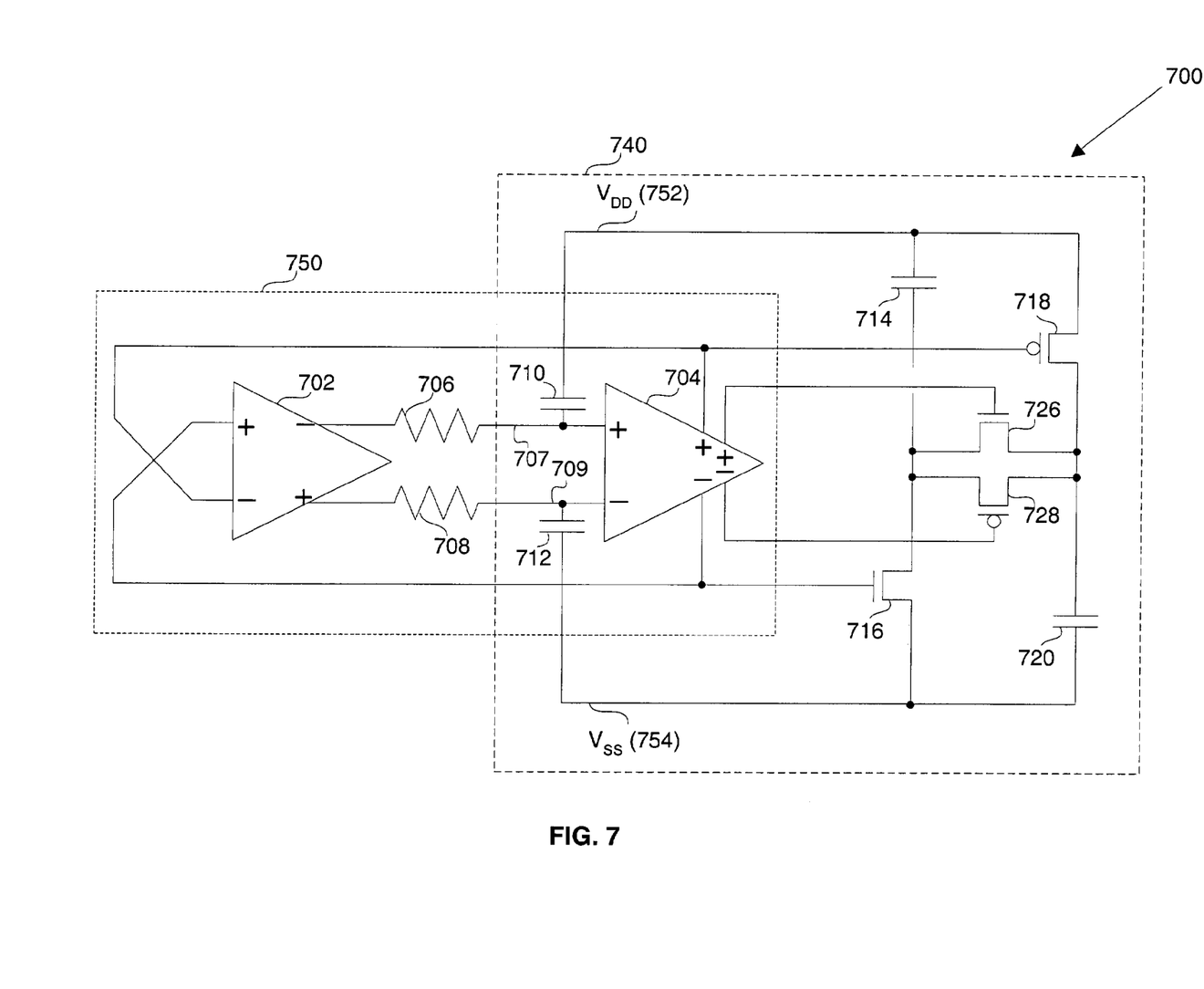
FIG. 7 shows a schematic of a voltage regulating circuit in accordance with an embodiment of the present invention.

FIG. 7 shows an exemplary circuit similar to that shown in FIG. 6, but configured to regulate the power supply voltage potential by lowering the power voltage potential when the power supply voltage potential is higher than desired. The positive and negative outputs of the comparator (704) are switched compared to the comparator (604) shown in FIG. 6 so that the capacitors are in the series configuration (520 shown in FIG. 5) when $V_{inst}$ is less than or equal to $V_{avg}$. When $V_{inst}$ (the power supply voltage potential) rises above $V_{avg}$ (the difference between the voltage potential carried on line (707) and the voltage potential carried on line (709)), the capacitors are switched into the parallel configuration (510 shown in FIG. 5).

Advantages of the present invention may include one or more of the following. In one or more embodiments, the present invention may regulate a voltage potential on a power supply line. The voltage potential on the power supply line may ring due to power supply resonance in a power distribution network. Regulating the voltage potential may improve the voltage potential of a power supply of an output buffer, thereby improving system performance.

In one or more embodiments, the present invention may demonstrate better performance characteristics than designs or implementations using non-local voltage regulating circuits.

In one or more embodiments, the present invention may limit the amount of power dissipated by the voltage regulating circuit while still effectively controlling a power supply resonance.

In one or more embodiments, there is no need to predict or detect circumstances that may cause resonance as the effects of resonance are monitored and those effects are actively counteracted.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An apparatus for compensating for power supply resonance in an integrated circuit, comprising:

a first power supply line arranged to propagate a first voltage potential;

a second power supply line arranged to propagate a second voltage potential, wherein a power supply voltage potential is a difference between the first voltage potential and the second voltage potential;

an output buffer operatively coupled to the first power supply line and the second power supply line, wherein the power supply voltage potential represents a voltage across the output buffer; and a voltage regulating circuit operatively coupled to the first power supply line and the second power supply line, wherein the voltage regulating circuit is local to the output buffer, and
wherein the voltage regulating circuit is arranged to reduce a change in the power supply voltage potential.

2. The apparatus of claim 1, wherein a plurality of output buffers on an integrated circuit are local to at least one voltage regulating circuit.

3. The apparatus of claim 1, wherein the voltage regulating circuit is operatively coupled to the output buffer by a low-impedance connection.

4. The apparatus of claim 1, wherein the voltage regulating circuit is arranged to compensate for a lowered power supply voltage potential.

5. The apparatus of claim 1, wherein the voltage regulating circuit comprises a high-pass filter.

6. The apparatus of claim 1, wherein the voltage regulating circuit comprises a charge pump.

7. The apparatus of claim 1, wherein the voltage regulating circuit comprises at least two capacitors operatively connected between the first power supply line and the second power supply line, wherein the at least two capacitors are configured to switch between a parallel configuration and a series configuration.

8. The apparatus of claim 7, wherein the at least two capacitors are in the series configuration when the power supply voltage potential is below a desired power supply voltage potential.

9. The apparatus of claim 7, wherein the at least two capacitors are in the parallel configuration when the power supply voltage potential is above a desired power supply voltage potential.

10. The apparatus of claim 7, further comprising mutually exclusive switches to control the at least two capacitors.

11. The apparatus of claim 1, further comprising mutually exclusive switches operatively controlled by a comparator, wherein the comparator is responsive to a change in the power supply voltage potential.

12. The apparatus of claim 11, further comprising a bias generator arranged to provide a bias voltage potential to the comparator, wherein the comparator is responsive to the bias voltage potential and the power supply voltage potential.

13. A method for compensating for power supply resonance in an integrated circuit, comprising:

propagating a first voltage potential on a first power supply line to the integrated circuit;

propagating a second voltage potential on a second power supply line to the integrated circuit, wherein a power supply voltage potential is a difference between the first voltage potential and the second voltage potential;

detecting a change in the power supply voltage potential local to an output buffer, wherein the power supply voltage potential represents a voltage across the output buffer; and selectively reducing the change in the power supply voltage potential local to the output buffer dependent on the detecting.

14. The method of claim 13, further comprising high-pass filtering the power supply voltage potential.

15. The method of claim 13, wherein the detecting and selectively reducing are performed for a plurality of output buffers on the integrated circuit.

16. The method of claim 13, wherein the selectively reducing comprises pumping charge onto at least one selected from the group consisting of the first power supply line and the second power supply line.

17. The method of claim 13, further comprising switching at least two capacitors operatively connected between the first power supply line and the second power supply line between a series configuration and a parallel configuration responsive to the detecting.

18. The method of claim 17, wherein the switching configures the at least two capacitors in the series configuration when the power supply voltage potential is below a desired power supply voltage potential.

19. The method of claim 17, wherein the switching configures the at least two capacitors in the parallel configuration when the power supply voltage potential is above a desired power supply voltage potential.

20. An apparatus for compensating for power supply resonance in an integrated circuit, comprising:

means for propagating a first voltage potential to the integrated circuit;

means for propagating a second voltage potential to the integrated circuit, wherein a power supply voltage potential is a difference between the first voltage potential and the second voltage potential;

output means for outputting a data signal;

means for detecting a change in the power supply voltage potential local to the output means, wherein the power supply voltage potential represents a voltage across the output means; and means for selectively reducing the change in the power supply voltage potential dependent on the means for detecting.

* * * * *